UNITED STATES PATENT OFFICE.

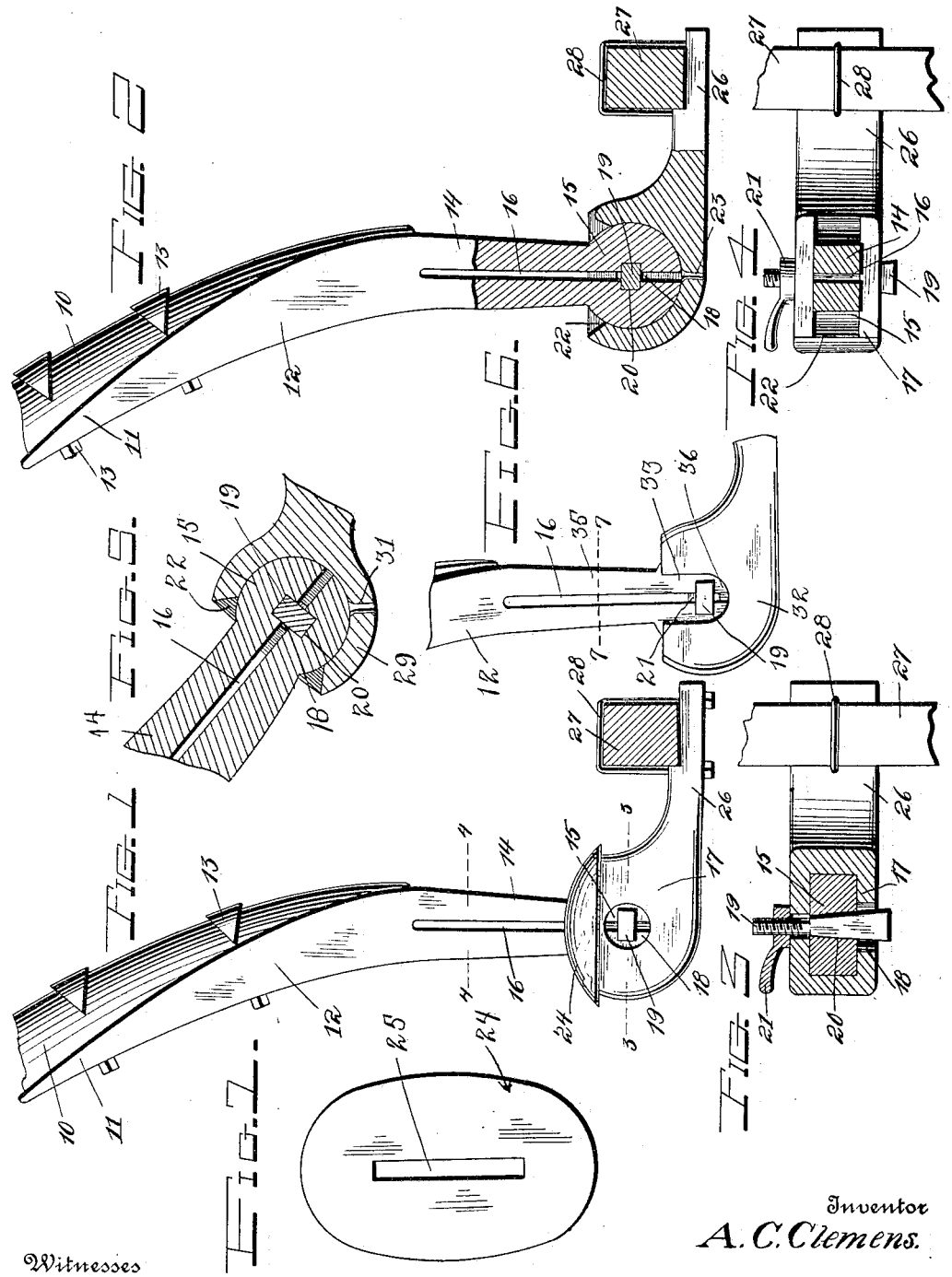

ALFRED C. CLEMENS, OF UPPER SANDUSKY, OHIO.

THILL-COUPLING.

1,091,633.  Specification of Letters Patent.  Patented Mar. 31, 1914.

Application filed January 18, 1912. Serial No. 671,978.

*To all whom it may concern:*

Be it known that I, ALFRED C. CLEMENS, a citizen of the United States, residing at Upper Sandusky, in the county of Wyandot, State of Ohio, have invented certain new and useful Improvements in Thill-Couplings; and I do hereby declare the following to be a full, clear, and exact description of the invention, such as will enable others skilled in the art to which it appertains to make and use the same.

This invention relates to new and useful improvements in thill couplings, and the primary object of the invention is to provide an improved coupling in the form of a disk and socket joint whereby the thills may be securely connected to the axle of a vehicle for free movement, and may also be prevented from rattling or becoming loose.

Another object of the invention is to provide a thill coupling in which a socket member is detachably connected to the axle and in which the thills are provided with bifurcated or split shanks and their extremities formed with an open disk adapted to be compressed for fitting the same into the socket and also readily removed when desired.

Another object of the invention is to provide means which is insertible through the socket member and adapted to be wedged between the front and rear furcations of the disk member, or head of the shank, for expanding the disk member within the socket, thereby insuring proper movement of the joint and preventing displacement of the disk member.

With the above and other objects in view, the invention consists of certain other combinations and arrangements of parts as will be hereinafter more fully described and claimed, it being a still further object of the invention to provide a device which will not be likely to get out of working order.

In the drawings: Figure 1 is a side elevation of my improved thill coupling connected to the rear end of a thill and with the axle shown in section. Fig. 2 is a similar view with the socket member shown in section. Fig. 3 is a sectional view on the line 3—3 of Fig. 1. Fig. 4 is a sectional view on the line 4—4 of Fig. 1. Fig. 5 is a view similar to Fig. 2 but showing a modified construction. Fig. 6 is a view similar to Fig. 1 of a still further modified construction. Fig. 7 is a detail plan view of a protecting washer for the disk and socket joint.

Referring to the drawings in detail, and more especially to Figs. 1 and 2, there is shown the rear end of a thill 10, the same being reinforced at its lower face with a reinforcing section of iron 11 forming the reduced forward portion of an upwardly and forwardly extending tapered socket member 12 which is secured to the thill by means of T-clips or bolts 13 to form a rigid connection between the thill and the socket member. The socket member 12 is formed with a shank 14 which is preferably rectangular in cross section as shown and which terminates in an enlarged circular disk or head 15, the disk and the shank being bifurcated or split transversely and vertically, as shown at 16, to space the opposite forks or furcations of the shank and permit their movement toward and away from each other. The furcations are normally separated and are adapted to be compressed for engaging within a circular and relatively flat socket 17 whereby the disk may have pivotal movement in said socket member, and the latter is provided with opposed apertures or recesses 18 through which a wedge bolt 19 of rectangular cross section is inserted and engaged within opposite rectangular recesses 20 in the opposite furcations and transversely thereof, whereby said wedge may be engaged by a hand nut 21 and thereby drawn or wedged between the furcations for separating the latter and expanding the disk within the socket, to prevent displacement of the parts, to insure proper pivotal movement and prevent rattling. The aperture 18 through which the wedge-bolt first passes is the larger, for permitting the latter to be inserted to the proper extent for fully expanding the disk.

The socket 17 is provided with opposite recesses 22 to allow proper movement of the shank 14 during the rotation of the disk therein, and is further provided with an escape opening 23 through which oil fed to the joint may pass, to prevent surplus collection thereof. A washer or protecting cap 24 preferably of leather and of oval form is provided with a longitudinal opening or slit 25 whereby the washer may be passed over the disk 15 before the latter is introduced into the socket, and is disposed in contact with the socket to prevent the entrance of sand or dust to interfere with the operation of the joint, while the socket 17 is further provided with a rearward extension or attaching shank 26 adapted to be secured to an axle 27 of a vehicle by a U-clip 28.

In Fig. 5 of the drawings there is shown a modified construction of the coupling which is especially adapted for heavy vehicles while the construction previously described is especially adapted for light vehicles and in this form the extension 26 has a socket member 29 extending forwardly and upwardly instead of directing upwardly as in the above construction, and the disk member 15 is similarly constructed so that the split furcations thereof are normally expanded, but the socket member 30 is extended upwardly in an inclined position directly from the shank proper instead of extending forwardly from the shank which is vertically disposed, as shown in Figs. 1 and 2 of the drawings. An escape opening 31 is provided in the bottom of the socket 29 but in this instance, the opening is located to one side of the open portion of the socket.

In Figs. 6 and 7 of the drawings, the socket member 32 is provided with recesses 33 upon opposite sides thereof communicating with the upper edge of the socket which is further provided with opposite end recesses to permit proper pivotal movement of the shank 35 and disk member 36 whereby the disk may be removed from the socket without removing the wedge bolt heretofore described, it being only necessary to loosen the bolt to permit the parts of the shank to be compressed within the socket when removing the disk.

I wish to have it understood that I may make such changes in the construction of the device as fairly fall within the scope of the appended claims, it being further understood that the device under the statutes is protected for all desirable uses to which it may be put without departing from the spirit or sacrificing any of the advantages of the invention.

I claim:

1. In a thill coupling, a bifurcated shank terminating in a disk which latter is provided with opposite recesses, a circular socket into which the disk is adapted to be sprung and in which the latter is normally fitted, said socket being provided with opposite recesses registering with the first said recesses when the disk is fitted in the socket, and means extending through the last said recesses and between the first said recesses for holding the disk expanded within the socket.

2. In a thill coupling, a bifurcated member comprising a shank and a disk, a circular socket provided with opposite recesses and adapted to receive the bifurcated disk, and means extending through the opposite recesses and between the furcations of the bifurcated disk for expanding it within the said circular socket.

3. In combination, a circular socket having opposite recesses of different sizes therein, a bifurcated disk fitted within the circular socket and provided with means for securing it to a thill, a wedge-bolt extending through the opposite apertures of the socket and between the furcations of said bifurcated disk, and a nut engaged with the wedge-bolt over the smaller of the two opposite apertures.

In testimony whereof, I affix my signature, in presence of two witnesses.

ALFRED C. CLEMENS.

Witnesses:
M. L. SULLIVAN,
H. ELLIS CHANDLEE.

---

Copies of this patent may be obtained for five cents each, by addressing the "Commissioner of Patents, Washington, D. C."